(12) United States Patent
Menzer et al.

(10) Patent No.: US 10,097,016 B2
(45) Date of Patent: Oct. 9, 2018

(54) SYSTEM AND DEVICE FOR MONITORING BATTERY STATUS

(71) Applicant: Littelfuse, Inc., Chicago, IL (US)

(72) Inventors: Andrew Menzer, Chicago, IL (US); Armando Zacarias, Port Barrington, IL (US)

(73) Assignee: Littelfuse, Inc., Chicago, IL (US)

( * ) Notice: Subject to any disclaimer, the term of this patent is extended or adjusted under 35 U.S.C. 154(b) by 163 days.

(21) Appl. No.: 15/189,259

(22) Filed: Jun. 22, 2016

(65) Prior Publication Data

US 2016/0372946 A1 Dec. 22, 2016

Related U.S. Application Data

(60) Provisional application No. 62/182,947, filed on Jun. 22, 2015.

(51) Int. Cl.
*H02J 7/00* (2006.01)
*H01M 10/42* (2006.01)
*H01M 10/48* (2006.01)
*H01M 10/44* (2006.01)

(52) U.S. Cl.
CPC ....... *H02J 7/0029* (2013.01); *H01M 10/4257* (2013.01); *H01M 10/44* (2013.01); *H01M 10/48* (2013.01); *H02J 7/0047* (2013.01); *H01M 2010/4271* (2013.01); *H01M 2010/4278* (2013.01); *H02J 2007/004* (2013.01); *H02J 2007/005* (2013.01)

(58) Field of Classification Search
CPC .. H01M 10/4257; H01M 10/44; H01M 10/48; H01M 2010/4271; H01M 2010/4278; H02J 2007/004; H02J 2007/005; H02J 7/0029; H02J 7/0047
See application file for complete search history.

(56) References Cited

U.S. PATENT DOCUMENTS

| | | | |
|---|---|---|---|
| 2010/0244868 A1* | 9/2010 | Cantave | G01R 1/04 324/754.21 |
| 2013/0166244 A1* | 6/2013 | Turgeon | H01M 10/44 702/117 |
| 2015/0353036 A1* | 12/2015 | Pierce | B60R 16/033 307/9.1 |

* cited by examiner

*Primary Examiner* — Vuthe Siek

(57) ABSTRACT

A system for measuring a current from a battery with a Hall Effect sensor, the current powering a primary load and a secondary load. The system to calculate a status of the battery based on the measured current, then compare the status of the battery to a predetermined value. The system to activate a relay when the status of the battery is below a predetermined value, activation of the relay to prevent the current from powering the secondary load.

18 Claims, 11 Drawing Sheets

*FIG. 9*

Measure a current from a battery with a Hall Effect sensor, the current powering a primary load and a secondary load
902

Calculate a status of the battery based on the measured current
904

Compare the status of the battery to a predetermined value
906

Activate a relay when the status of the battery is below the predetermined value, activation of the relay to prevent the current from powering the secondary load
908

SYSTEM AND DEVICE FOR MONITORING BATTERY STATUS

CROSS-REFERENCE TO RELATED APPLICATIONS

The present application claims priority to U.S. Provisional Patent Application No. 62/182,947 filed Jun. 22, 2015, titled "System and Device for Monitoring the Status of a Battery," the entirety of which is incorporated by reference herein.

FIELD OF THE DISCLOSURE

Embodiments of the present disclosure relate generally to battery monitoring systems and devices, and more particularly to a system and device for accurately monitoring the status of a battery in a transportation system.

BACKGROUND OF THE DISCLOSURE

Battery powered electrical systems are employed in a wide variety of applications. For example, in trucks that are used to transport cargo over roadways to intended destinations, a tractor and one or more trailers may be electrically linked via wires and cables to supply power to numerous electrical systems located on the tractor and/or the trailer. One such electrical system is a refrigeration unit (or "reefer") for keeping cargo refrigerated during transport. The reefer can use a reefer battery and generator to operate when the tractor engine is in an inactive or power-off condition. The reefer battery supplies electrical power necessary to start the generator. In order to provide sufficient generator cranking power, the reefer battery needs to maintain a predetermined supply voltage.

A problem commonly associated with battery monitoring systems is allowing a monitored battery to discharge below a predetermined supply voltage. Another problem commonly associated with battery monitoring systems is identifying dangerous conditions associated with a monitored battery. It is with respect to these and other considerations that the present improvements may be useful.

SUMMARY

This summary is provided to introduce a selection of concepts in a simplified form that are further described below in the Detailed Description. This Summary is not intended to identify key features or essential features of the claimed subject matter, nor is it intended as an aid in determining the scope of the claimed subject matter.

An exemplary embodiment of a system for monitoring a battery in accordance with the present disclosure can include a housing having an input, an output, and a communication port. The housing may enclose a printed circuit board (PCB). An input terminal may extend through the input port of the housing. The input terminal can be electrically connected to a positive terminal of a battery. An output terminal may extend through the output port of the housing. The output terminal can be electrically connected to the input terminal and a primary load. A transducer can be coupled to the PCB. The transducer may be configured to sense an electric field generated by a current flowing from the positive terminal of the battery through the input terminal to the primary load and a plurality of secondary loads. A relay may be coupled to the PCB. The relay can be configured to prevent current from reaching at least one of the plurality of secondary loads. A control link may extend through the communication port and have first and second ends. The first end can be communicatively coupled to the PCB. An interface module can be coupled to the second end of the control link. The interface module can be configured to indicate a status of the battery based on the sensed electric field.

An exemplary embodiment of an apparatus in accordance with the present disclosure, can include a housing having an input port and an output port. The housing may enclose a printed circuit board (PCB). A stud may include an input terminal and an output terminal. The input terminal to extend through the input port of the housing and electrically connect to a battery. The output terminal to extend through the output port of the housing and electrically connect to a primary load. A transducer coupled to the PCB to measure a current in the stud. The transducer positioned on the PCB such that at least a portion of the transducer is located directly adjacent the stud.

An exemplary embodiment of a method in accordance with the present disclosure can include: measuring a current from a battery with a Hall Effect sensor, the current powering a primary load and a secondary load; determining a status of the battery based on the measured current; comparing the status of the battery to a predetermined value; and activating a relay when the status of the batter is below the predetermine value to prevent the current from powering the secondary load.

BRIEF DESCRIPTION OF THE DRAWINGS

By way of example, various embodiments of the disclosed device will now be described, with reference to the accompanying drawings, in which:

FIG. 9 is an exemplary logic flow in accordance with an embodiment of the present disclosure.

DETAILED DESCRIPTION

Figure 1:
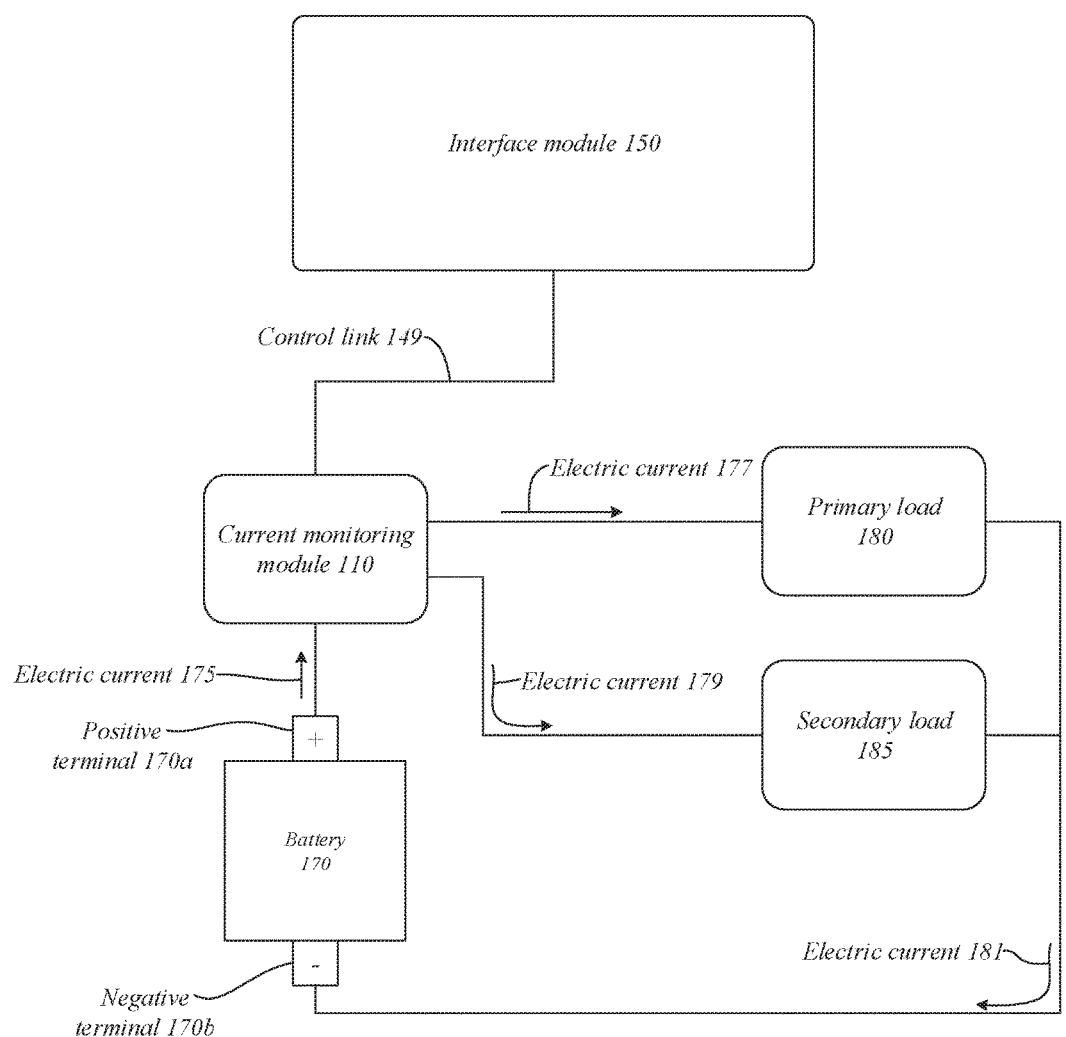
FIG. 1 is a schematic of an exemplary battery monitoring system in accordance with an embodiment of the present disclosure.

The present embodiments will now be described more fully hereinafter with reference to the accompanying drawings, in which some embodiments are shown. The subject matter of the present disclosure, however, may be embodied in many different forms and should not be construed as limited to the embodiments set forth herein. Rather, these embodiments are provided so that this disclosure will be thorough and complete, and will fully convey the scope of the subject matter to those skilled in the art. In the drawings, like numbers refer to like elements throughout.

Referring to FIG. 1, an exemplary embodiment of a battery monitoring system 100 is shown. The battery monitoring system 100 can include a battery 170, a primary load 180, a secondary load 185, a current monitoring module 110, and an interface module 150. The current monitoring module 110 may be electrically connected to a positive terminal 170a of the battery 170. The current monitoring module 110 can also be electrically connected to the primary load 180 and the secondary load 185. The primary and secondary loads 180, 185 (hereinafter "loads 180, 185"), can further be electrically connected to the negative terminal 170b of the battery 170 to create a circuit which can be used to power the loads. In some embodiments, the primary load 180 can be a refrigeration unit, while the secondary load 185 may include one or more of a fan, a light, a display, a transducer, a pump, or the like.

As noted, the battery 170 may have a positive terminal 170a and a negative terminal 170b. The positive terminal 170a can be at a supply voltage and the negative terminal 170b can be at a return voltage. The difference between the supply voltage and the return voltage, or battery potential, can cause current to flow in the circuit, thereby powering the loads 180, 185. Electric current 175 can flow from the positive terminal 170a of the battery 170 to the current monitoring module 110 at the supply voltage.

The current monitoring module 110 may provide loads 180, 185 with respective electric currents 177, 179. In various embodiments, current monitoring module 110 may include logic circuitry (see e.g., logic circuitry 802, FIG. 8A) to implement one or more operations described herein. The power to operate loads 180, 185 can be provided via electric currents 177, 179 at corresponding load voltages. In some embodiments, the load voltages corresponding to electric currents 177, 179 are the same. In other embodiments, the load voltages corresponding to electric currents 177, 179 are different. As previously noted, the loads 180, 185 may be connected to the negative terminal 170b of the battery 170 so that electric current 181 may flow along the connection between the loads 180, 185 and the negative terminal 170b of the battery 170 at the return voltage to complete the circuit powering of the loads 180, 185.

The current monitoring module 110 can be configured to measure the electric current 175 flowing from the positive terminal 170a of the battery 170. The current monitoring module 110 can also be communicatively coupled to an interface module 150. In various embodiments, interface module 150 may include logic circuitry (see e.g., logic circuitry 804, FIG. 8B) to implement one or more operations described herein.

In various embodiments, current monitoring module 110 may provide electrical power to interface module 150. In the illustrated embodiment, the current monitoring module 110 is communicatively coupled to the interface module 150 by a control link 149. In some embodiments, current monitoring module 110 or interface module 150 receive power via control link 149. The current monitoring module 110 may provide information (e.g., bit stream) based on the measured electric current 175 to the interface module 150 via the control link 149, and the interface module 150 can, in turn, determine a status of the battery 170 based on the information provided by the current monitoring module 110. For instance, interface module 150 may decode a bit stream received over control link 149 indicating the status of battery 170. In various embodiments, current monitoring module 110 may measure one or more of electric currents 177, 179, 181. In various such embodiments, current monitoring module 110 may provide information based on the one or more measured electric currents 177, 179, 181 to interface module 150 via control link 149, and the interface module 150 can, in turn, determine a current or voltage provided to one or more of loads 180, 185. For example, interface module 150 may decode a bit stream received over control link 149 indicating a measured current or voltage relative to battery 170. In various embodiments, interface module 150 may determine the status of battery 170 based on a received bit stream indicating a measured current or voltage. In some embodiments, control link 149 may include a plurality of independent conductors, such as an Ethernet or coaxial connection, for instance.

The battery monitoring system 100 may have one or more components of logic circuitry including logic circuits, processors, programmable logic arrays, and programmable logic controllers to monitor and control the system. The components may apply magnetic field equations to convert the measured electric field into a measured electric current. The components may apply Ohm's Law to convert a measured electric current to a supply voltage. As will be described further with respect to FIGS. 8A-8B, components of logic circuitry may be disposed of in one or more of current monitoring module 110 and interface module 150.

The battery monitoring system 100 may be configured to monitor and/or determine a variety of status measures for the battery 170. Examples of such status measure include health, charge, and/or temperature of the battery 170. In some embodiments, a status of the battery 170 may be calculated based on a measured current. In various embodiments, the status of the battery 170 may be compared to a predetermined value and current provided from the battery to one or more loads may be adjusted based on the comparison. The health of the battery 170 may be represented by a current charge capacity of the battery as a percent of the original charge capacity of the battery 170. The charge of the battery may be represented by a current supply voltage of the battery 170 as a percent of a maximum supply voltage (e.g., 6, 12, 18, 24, 36, or 48 volts). In some embodiments, the interface module 150 may estimate a time until the supply voltage of the battery 170 will drop below a predetermined value under current or projected load conditions.

Figure 2:
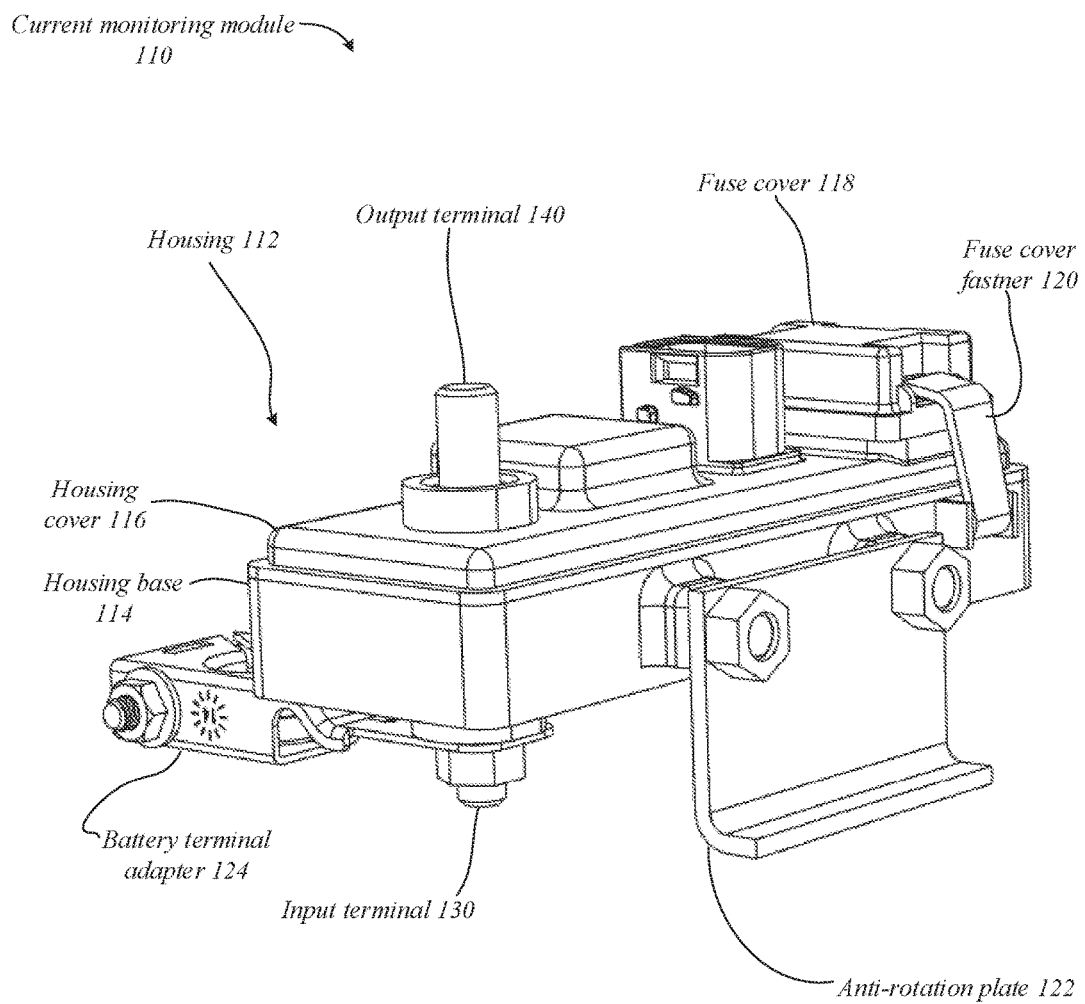
FIG. 2 is an isometric view of an exemplary current monitoring module in accordance with an embodiment of the present disclosure.

Referring now to FIG. 2, a current monitoring module 110 consistent with a non-limiting, exemplary embodiment of the present disclosure is shown. The current monitoring module 110 may include housing 112, input terminal 130, and output terminal 140. The input terminal 130 can electrically connect the current monitoring module 110 to the battery 170 (FIG. 1). In the illustrated embodiment, the input terminal 130 is connected to the positive terminal 170a of the battery 170 (FIG. 1) by a battery terminal adapter 124. The output terminal 140 can be electrically connected to the loads 180, 185 (FIG. 1). In some embodiments, the input and output terminals 130, 140 can have different diameters to prevent improper wiring of the terminals 130, 140. In various embodiments, the input and output terminals 130, 140 may be a single piece of conductive material 100 (see e.g., FIG. 5). In some embodiments, the input and/or output terminals 130, 140 may be threaded to assist in coupling the terminals 130, 140 to battery terminal adapter 124, the battery 170 and/or the loads 180, 185.

The housing 112 may enclose and protect one or more components of the current monitoring module 110 from the environment. The housing 112 may include a housing base 114 and a housing cover 116. The housing base 114 and/or the housing cover 116 may include features to facilitate engagement between the two pieces. Such features can include slots, channels, flanges, holes, threads, clips, or the like to facilitate connecting the housing base 114 to the housing cover 116. In addition, one or more sealing elements such as gaskets, O-rings or the like, may be used to create an environmental seal between the housing base 114 and the housing cover 116. In various embodiments, one or more of terminals 130, 140 may be mechanically attached to the housing 112. For example, one or more of terminals 130, 140 can be mechanically attached to the housing 112 via staking, orbital riveting or the like.

The housing cover 116 may have a fuse cover 118 coupled thereto. The housing cover 116, the fuse cover 118, and/or the housing base 114 can have one or more features for facilitating engagement between the housing cover 116 and the fuse cover 118. In addition, one or more sealing elements such as gaskets, O-rings or the like, may be used to create an environmental seal between fuse cover 118 and housing cover 116. In the illustrated embodiment, a plurality of fuse cover fasteners 120, coupled to the housing base 114, can be used to releasably secure the fuse cover 118 to the housing cover 116. The fuse cover fasteners 120 of the illustrated embodiment comprise clips that are rotatably coupled at one end to the housing base 114, and that have a geometric feature such as a hook, shoulder or the like disposed at the opposite end for engaging a corresponding feature of the fuse cover 118. Thus arranged, the clips can clamp the fuse cover down onto the housing cover 116 to releasably hold the fuse cover in place.

An anti-rotation plate 122 may be coupled to the housing base 114 and may be used to prevent the current monitoring module 110 from moving relative to the battery 170 (FIG. 1) when coupled thereto. The anti-rotation plate 122 may be engaged with a support structure (not shown) associated with the battery 170 (FIG. 1) to prevent such movement of the current monitoring module 110 relative to the battery. In some embodiments, the anti-rotation plate 122 may be coupled to the support structure via any of a variety of mechanical connection techniques such as welding, or a fastener, such as a screw, nut and bolt, clip, or the like.

Figure 3A:
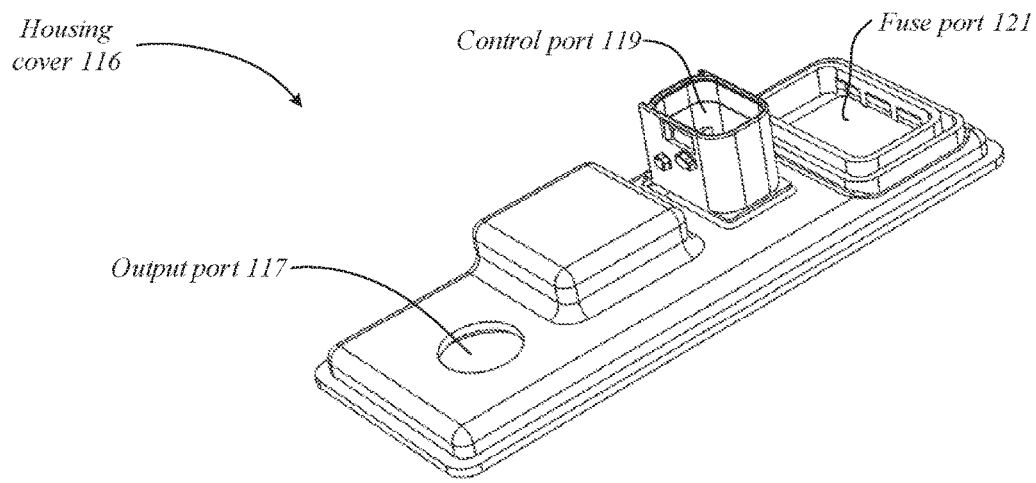
FIG. 3A is an isometric view of an exemplary housing cover in accordance with an embodiment of the present disclosure.

FIG. 3A shows an exemplary housing cover 116 consistent with the present disclosure. The housing cover 116 may include an output port 117, a control port 119, and a fuse port 121. The output port 117 may be sized and configured so that the output terminal 140 (FIG. 2) may extend through the output port. One or more gaskets, O-rings, and the like may be used to create an environmental seal between the output terminal 140 and the output port 117 as will be described further in relation to FIGS. 5-7 below.

The control port 119 may be sized and configured to receive the control link 149 therein. In some embodiments, the control port 119 and/or a first end of the control link 149 can have one or more features for securing the first end of the control link 149 to the control port 119. The one or more features can include a plug arrangement, slots, channels, flanges, holes, threads, gaskets, O-rings, clips, or the like to facilitate connecting and creating an environmental seal between the first end of the control link 149 and the control port 119. In some embodiments the control link 149 (FIG. 1) may extend through the control port 119.

Figure 4A:
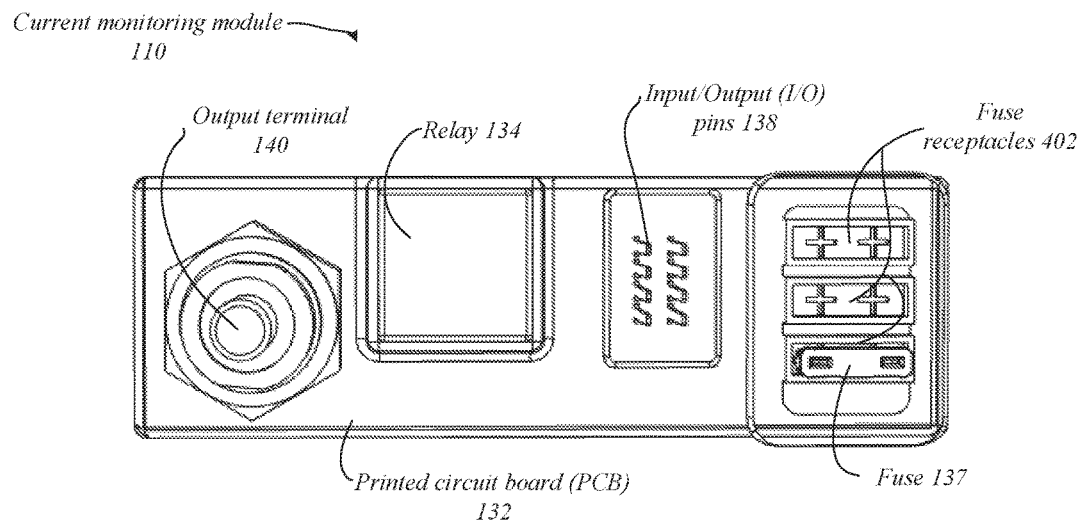
FIG. 4A is a top view of an exemplary current monitoring module with the housing removed in accordance with an embodiment of the present disclosure.

The fuse port 121 may be sized and configured to receive one or more fuses, such as fuse 137, in the manner shown in FIG. 4A. The fuse cover 118 may cover the one or more fuses 137 in the manner shown and described in relation to FIG. 2. The fuse(s) 137 may be accessed by releasing the fuse cover fasteners 120 and removing the housing cover 116.

Figure 3B:
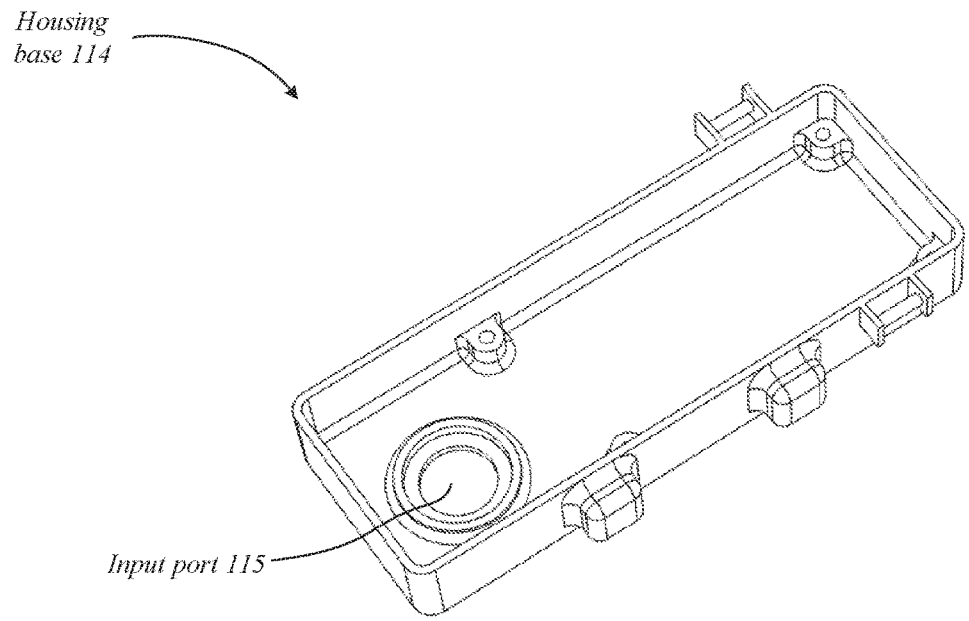
FIG. 3B is an isometric view of an exemplary housing base in accordance with an embodiment of the present disclosure.

Referring now to FIG. 3B, the housing base 114 may include an input port 115 sized and configured for receiving the input terminal 130 (FIG. 2) therethrough. One or more gaskets, O-rings, or the like may be used to create an environmental seal between the input terminal 130 and the input port 115 as will be described further in relation to FIGS. 5-7 below. As will be appreciated, the environmental seal may prevent the ingress of moisture, dust or other contaminants into the interior portion of the current monitoring module 110. In one embodiment, the environmental seal may prevent the ingress of water when the current monitoring module is washed or rinsed with a sprayed source of water.

Figure 4B:
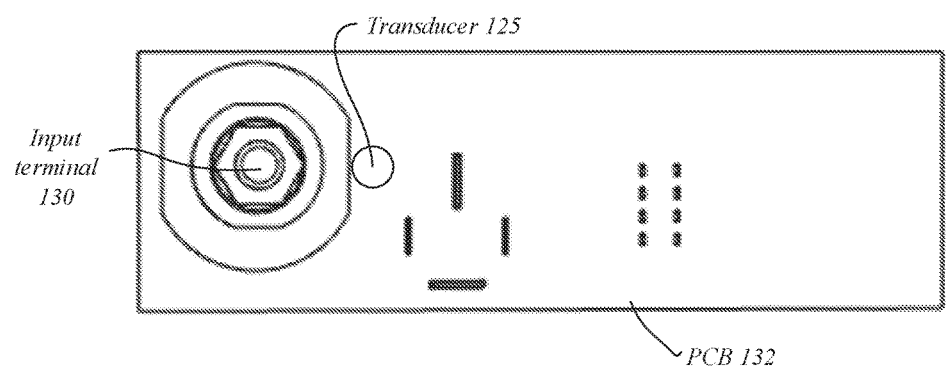
FIG. 4B is a bottom view of an exemplary current monitoring module with the housing removed in accordance with an embodiment of the present disclosure.

FIGS. 4A and 4B show top and bottom views, respectively of an exemplary current monitoring module 110 with the housing 112 removed. The current monitoring module 110 can include a printed circuit board (PCB) 132 to which the input and output terminals 130, 140 are coupled. The current monitoring module 110 can further include a transducer 125, a relay 134, a plurality of fuse receptacles 402, fuse 137 disposed in one of the plurality of fuse receptacles 402, and input/output pins 138. The input/output pins 138 may be accessed via the control port 119 (FIG. 3A), for example, to allow connection between the current monitoring module 110 and the interface module 150. In some embodiments, the interface module 150 (FIG. 1) can be coupled to the PCB 132. In other embodiments, the interface module 150 can be positioned remote from the PCB 132.

The transducer 125 may be configured to sense an electric field generated by the electric current 175 (FIG. 1) flowing from the battery 170 (FIG. 1) through the input terminal 130 and may generate data in response. By sensing the electric field created by a flow of electrons, the current can be measured and can be used to reduce losses associated with the measurement as compared to other measurement techniques such as calculating the current based on the voltage drop across a resistor. In one non-limiting exemplary embodiment, the transducer 125 includes a Hall Effect sensor. Positioning of the transducer 125 will be described in more detail with reference to FIG. 7 below.

The PCB may be constructed to enable the components coupled to the PCB to be electrically connected via one or more traces (not shown). For example, the transducer 125 and at least one of the input/output pins 138 can be connected by a first trace to communicate data generated by the transducer 125 to the interface module 150 (FIG. 1). A second trace (not shown) may divert current from the output terminal 140 through the relay 134 to the secondary load 185 (FIG. 1) via one or more of the input/output pins 138. In some embodiments, the relay 134 includes a box relay. A third trace (not shown) may provide an actuation link between the relay 134 and an input pin 138. The third trace may enable the interface module 150 (FIG. 1) to open and close the relay 134. In exemplary embodiments, the relay 134 may be normally closed to prevent current from reaching the secondary load 185 in response to the battery status falling outside of a predetermined threshold. Preventing current from reaching a secondary load 185 can prolong the amount of time the battery 170 can provide sufficient energy to operate the primary load 180. For example, if the primary load 180 is a refrigeration unit and the secondary 185 load is a light, current can be prevented from reaching the light in order to extend the remaining operational time of the refrigeration unit.

In some embodiments, the PCB 132 may be connected to a temperature transducer (not shown). The temperature transducer may enable the interface module 150 to monitor a temperature of the battery monitoring system 100. Thus arranged, if the temperature of a portion of the battery monitoring system 100 exceeds a predetermined threshold, the interface module 150 (FIG. 1) may prevent current from reaching the secondary load 185. As will be appreciated, by cutting current to the secondary load 185, the battery 170 may be maintained at cooler temperatures, thus extending the health or charge duration of the battery.

As noted, each of the fuse receptacles 402 may be configured to receive a fuse 137. As will be appreciated, the fuse(s) 137 can prevent potentially dangerous current or voltage levels from reaching the primary and/or secondary load 180, 185. In some embodiments, a forth trace on the PCB 132 may electrically connect the input terminal 130 of the current monitoring module 110 to the secondary load 185 through the fuse 137. As will be appreciated, the fuse 137 can be selected to cut the electrical connection between the input terminal 130 and the secondary load when a predetermined amount of current and/or voltage pass through the fuse.

It will be appreciated by one having ordinary skill in the art that the traces and components coupled to the PCB as described above can be readily combined or modified without departing from the scope of the disclosure. For example, the PCB 132 may include logic circuitry configured to store data generated by the transducer on a non-transitory computer-readable memory, and one or more traces can provide the necessary electrical connections. Further, multiple traces may be used to provide redundant or backup communication and/or power channels.

Figure 5:
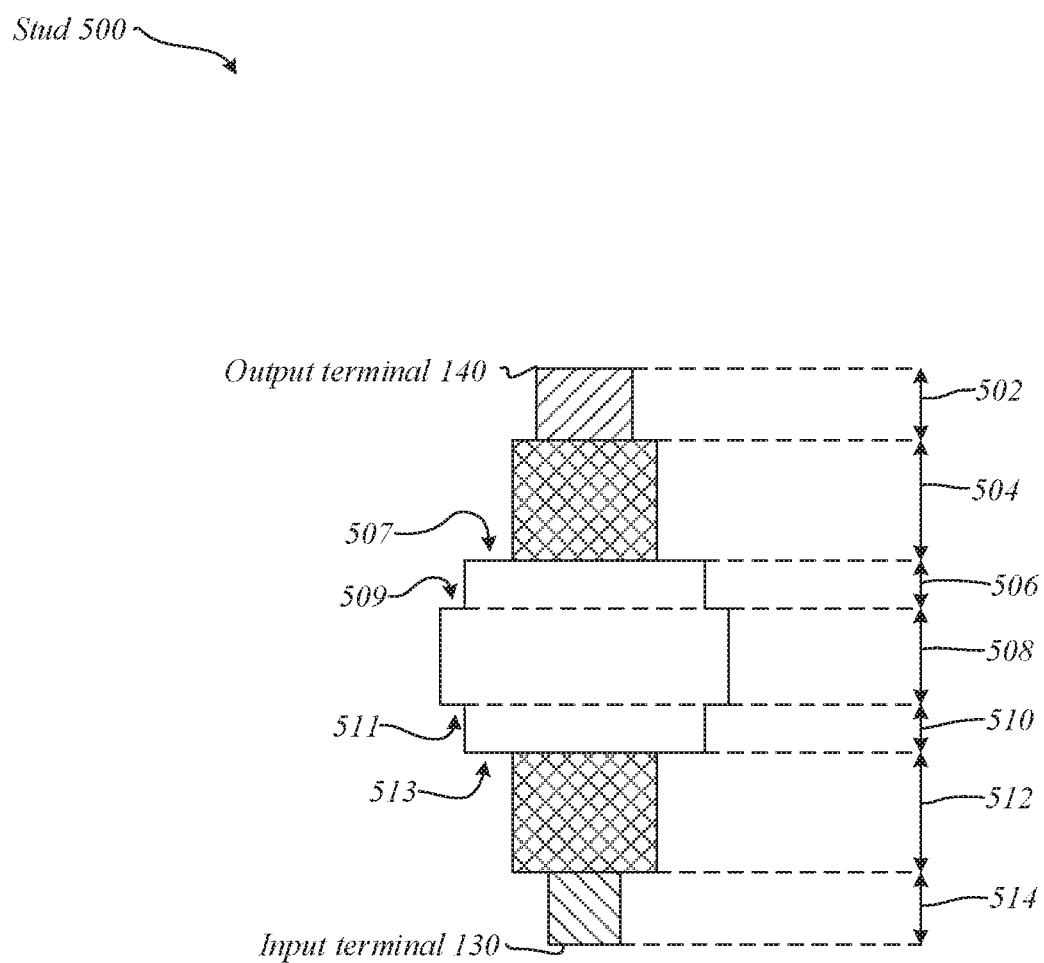
FIG. 5 is a cross-section view of an exemplary stud in accordance with an embodiment of the present disclosure.

FIG. 5 illustrates an exemplary embodiment of a stud 500 which, as will be described, may include the input terminal 130 and the output terminal 140 of the current monitoring module 110. In the illustrated embodiment, the stud 500 may comprise the input terminal 130 and output terminal 140 as a single piece. By forming the input and output terminals 130, 140 as a unitary stud 500, in lieu of providing the input and output terminals as separate pieces, a reduction in voltage drop can be achieved as current passes from input terminal 130 to output terminal 140. Forming the input and output terminals 130, 140 as a unitary stud 500 may also reduce the heat generated as current passes from input terminal to output terminal. In various embodiments, stud 500 may be created from one or more manufacturing processes, such as machining, casting, forging, or the like.

In the illustrated embodiment, stud 500 may include a plurality of sections 502, 504, 506, 508, 510, 512, 514. As will be described, the features of the individual sections 502, 504, 506, 508, 510, 512, 514 may be selected to facilitate assembly of the stud 500 to the other components of the current monitoring module 110 and may also facilitate the connection of external conductors to the input and output terminals 130, 140. In some embodiments, stud 500 may include different materials, such as conductors, semiconductors, and/or insulators. For example, stud 500 may include a copper core with a metal jacket. In various embodiments, one or more sections of stud 500 may be created separately. For example, one or more sections may include a sleeve or an overlay. In various such embodiments, separately created sections of stud 500 may include features to connect or couple stud 500 to one or more of housing 512, PCB 132, transducer 125, gaskets, fasteners, fasteners, or the like. In some embodiments, one or more sections 502, 504, 506, 508, 510, 512, 514 or portions thereof may be electrically isolated from one or more other sections of the stud 500.

In some embodiments, section 502 may comprise output terminal 140 and section 514 may comprise input terminal 130. Sections 502, 514 may be configured to enable the making of electrical connections external to housing 112. In various embodiments, sections 502, 514 may be threaded to simplify the making of such connections. In some embodiments, sections 502 and 514 may also have different sized threads and/or diameters to enable a user or technician to readily differentiate between the input and output terminals 130, 140. For example, in the illustrated embodiment, section 502 has a larger diameter than section 514 to minimize the chance that a technician could miswire the input and output terminals 130, 140.

Sections 504, 506 may include features to create an environmental seal between the housing cover 116 (FIG. 3A) and stud 500. Section 506 can include surface 507. In one embodiment, surface 507 of section 506 may provide a seat for housing cover 116. For example, the output port 117 of housing cover 116 may have a diameter larger than those of sections 502, 504 of stud 500, but smaller than a diameter of section 506. Thus, when stud 500 is inserted into output port 117, surface 505 of section 506 may act as a seating surface for the housing cover 116. In various embodiments, section 504 may also be threaded. The threads of section 504 may enable housing cover 116 to be secured to stud 500. For example, a fastener (see e.g., cover fastener 602, FIGS. 6A-B) with an outside diameter larger than a diameter of output port 117 may engage the threads of section 504, and may be tightened down into engagement with an upper surface of the housing cover 116 adjacent to the output port to secure the stud 500 to the housing cover. In some embodiments, one or more sealing members, such as gaskets or O-rings, may be compressed between housing cover 116 and surface 505 of the stud 500 to create an environmental seal between the housing cover 116 and stud 500 (see e.g., FIGS. 6A-B). A sealing member may also be disposed between the nut and the upper surface of the housing cover to provide an additional or alternative seal.

Section 508 may include features for coupling the stud 500 to PCB 132. In various embodiments, PCB 132 (FIGS. 4A-B) may have an opening sized and configured to receive section 508. In various embodiments, PCB 132 may be coupled to section 508 via one or more of ultrasonic welding, fasteners, and adhesives. Section 508 may include surface 509 and surface 511. In some embodiments, one or more of surfaces 509, 511 may serve as a seat for PCB 132. In various embodiments, one or more conductive connections are made between PCB 132 and stud 500.

Sections 510, 512 may include features to create an environmental seal between the housing base 114 (FIG. 3B) and stud 500. The features of sections 510, 512 may be the same or similar to the features of sections 504, 506. Section 510 can include surface 511. In one embodiment, surface 513 of section 510 may provide a seat for housing base 114. For example, the input port 115 of housing base 114 may have a diameter larger than those of sections 512, 514 of stud 500, but smaller than a diameter of section 510. Thus, when stud 500 is inserted into input port 115, surface 513 of section 510 may act as a seating surface for the housing base 114. In various embodiments, section 512 may also be threaded. The threads of section 512 may enable housing base 114 to be secured to stud 500. For example, a fastener (see e.g., base fastener 604, FIGS. 6A-B) with an outside diameter larger than a diameter of input port 115 may engage the threads of section 512, and may be tightened down into engagement with a lower surface of the housing base 114 adjacent to the input port 115 to be used to secure the housing base 114. In some embodiments, one or more sealing members, such as gaskets or O-rings, may be compressed between housing base 114 and the surface 513 of the stud 500 to create an environmental seal between the housing base 114 and stud 500 (see e.g., FIGS. 6A-B). A sealing member may also be disposed between the nut and the upper surface of the housing cover to provide an additional or alternative seal.

Figure 6A:
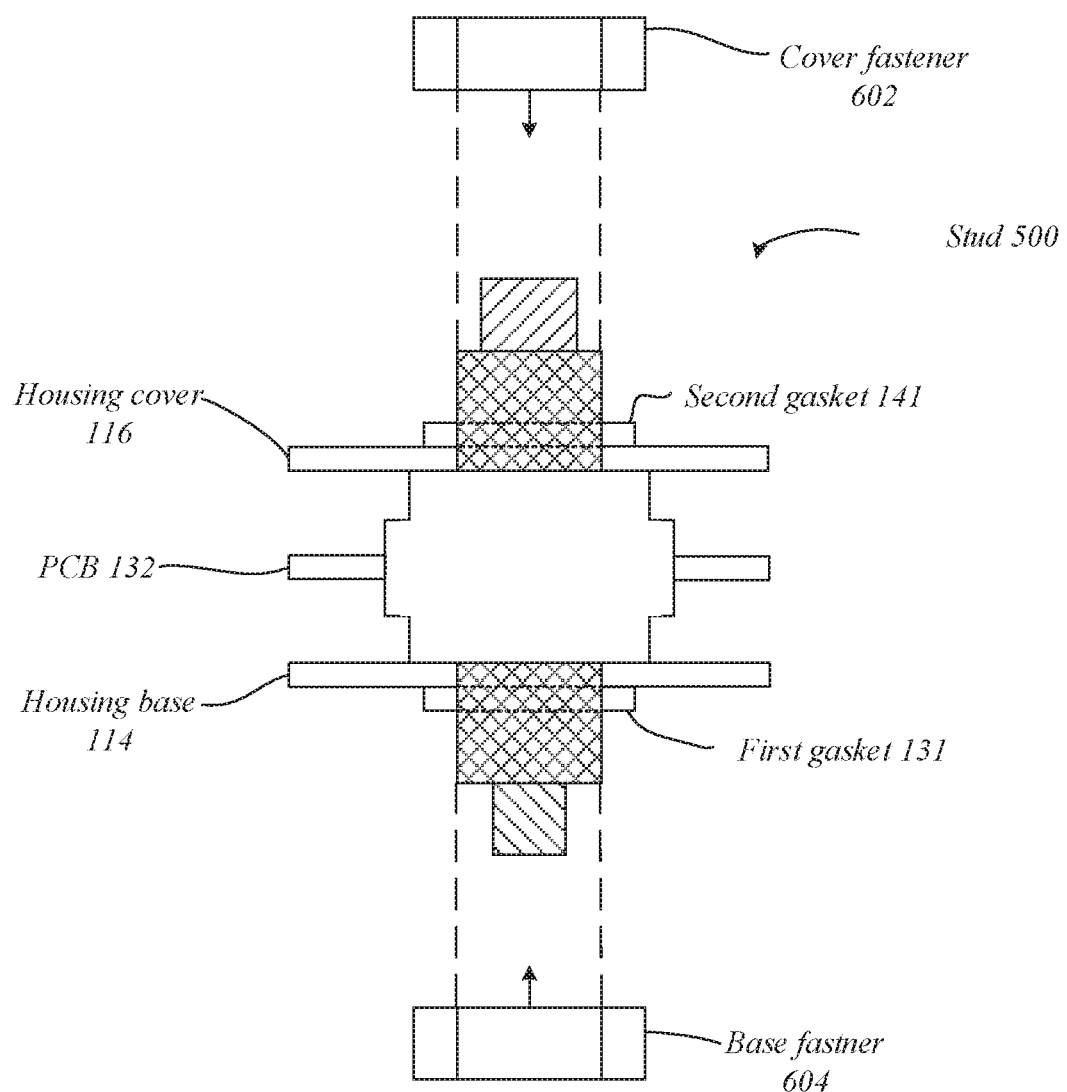
FIG. 6A is a cross-section view of an exemplary stud in conjunction with other current monitoring module components in accordance with an embodiment of the present disclosure.

Referring now to FIG. 6A, a cross-section view of stud 500 in conjunction with current monitoring module 110 components housing base 114, housing cover 116, and PCB 132 consistent with a non-limiting embodiment of the present disclosure is shown. A first gasket 131 may be used to couple and seal the input port 115 (FIG. 3B) of the housing base 114 to stud 500, creating an environmental seal therebetween. A second gasket 141 may be used to couple and seal the output port 117 of the housing cover 116 (FIG. 3a) to stud 500, creating an environmental seal therebetween. In various embodiments, the second gasket 141 may be compressed between housing cover 116 and cover fastener 602 and first gasket 131 may be compressed between housing base 114 and base fastener 604 to create environmental seals. In some embodiments, cover and base fasteners 602, 604 may compress housing base 114 and housing cover 116 together to create an environmental seal therebetween.

Cover and base fasteners 602, 604 may include one or more of nuts, screws, or any other mechanical closure. For instance, cover and base fasteners 602, 604 may each include a nut threadably receivable on sections 504, 512 (FIG. 5) of the stud 500 to compress first and second gaskets 131, 141. For example, fasteners 602, 604 may apply pressure to first and second gaskets 131, 141, respectively, when secured to stud 500. The pressure may compress first gasket 131 between housing base 114 and base fastener 604 and second gasket 141 between housing cover 116 and cover fastener 602. Stud 500, gaskets 131, 141, fasteners 602, 604, and input and output ports 115, 117 (FIG. 3A-B) of housing 112 can have one or more features to receive and secure stud 500 to one or more other portions of current monitoring module 110, such as housing base 114, housing cover 116, and/or PCB 132. The one or more features can include slots, channels, flanges, holes, threads, clips, or the like to connect and create an environmental seal between the ports 115, 117 and stud 500.

Figure 6B:
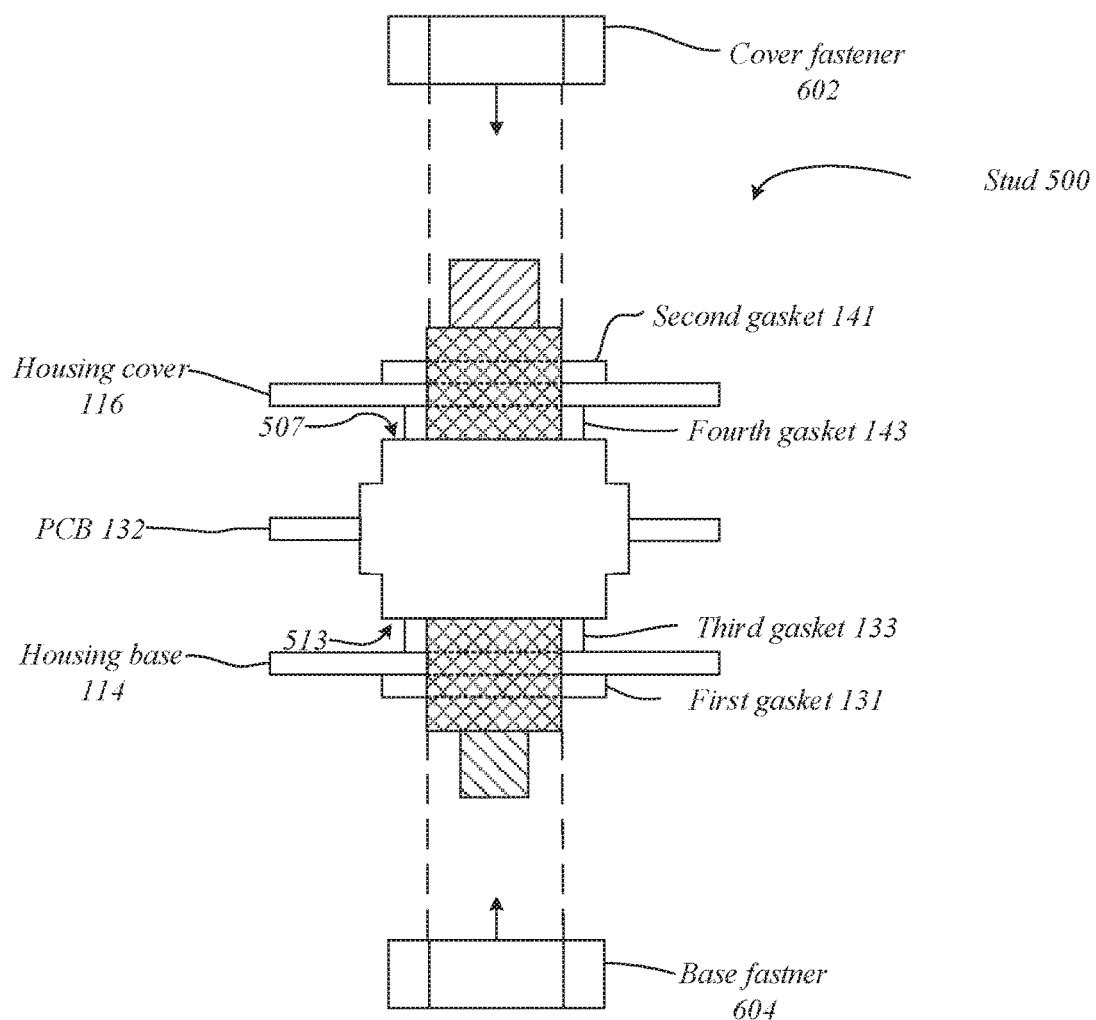
FIG. 6B is a cross-section view of an exemplary stud in conjunction with other current monitoring module components in accordance with an embodiment of the present disclosure.

Referring now to FIG. 6B, a cross-section view of stud 500 in conjunction with current monitoring module 110 components housing base 114, housing cover 116, and PCB 132 consistent with a non-limiting embodiment of the present disclosure is shown. FIG. 6B can include third and fourth gaskets 133, 143 in addition to first and second gaskets 131, 141 described with respect to FIG. 6B. In various embodiments, first and third gaskets 131, 133 may be used to couple and seal the input port 115 (FIG. 3B) of housing base 114 to stud 500, creating an environmental seal therebetween. Similarly, second and fourth gaskets 141, 143 may be used to couple and seal the output port 117 (FIG. 3A) of housing cover 116 to stud 500, creating an environmental seal therebetween.

In various embodiments, third gasket may be compressed between housing cover 116 and surface 507 of stud 500 and fourth gasket 143 may be compressed between housing base 114 and surface 513 of stud 500 to create environmental seals therebetween. Compression of gaskets 133, 143 may be achieved with one or more of nuts, screws, or any other mechanical closure. For example, cover and base fasteners 602, 604 may each include a nut to be threaded onto sections 504, 512 (FIG. 5) to compress gaskets 131, 133, 141, 143. Stud 500, gaskets 131, 133, 141, 143, and input and output ports 115, 117 (FIG. 3A-B) of housing 112 can have one or more features to receive and secure stud 500 to one or more portions of current monitoring module 110, such as housing base 114, housing cover 116, or PCB 132. The one or more features can include slots, channels, flanges, holes, threads, clips, or the like to facilitate the environmental seal between the ports 115, 117 and the terminals 130, 140.

In various embodiments one or more additional or different sealing members may be used to create the aforementioned environmental seals between housing cover 116, housing base 114, and/or stud 500. In some embodiments gaskets 131, 133, 141, 143 may provide a flexible connection between stud 500 and one or more other components of current monitoring module 110, such as housing 112 or PCB 132. As will be appreciated, flexible connections between components of current monitoring module 110 can reduce mechanical stress and strain on the current monitoring module 110. It will also be appreciated that components for creating an environmental seal between the ports 115, 117 and stud 500 described above can be readily combined or modified without departing from the scope of the disclosure. For example, a plurality of gaskets and/or O-rings may be used to connect and seal each of the input terminal and the output terminal to associated surfaces of the housing base 114 and housing cover 116.

Figure 7:
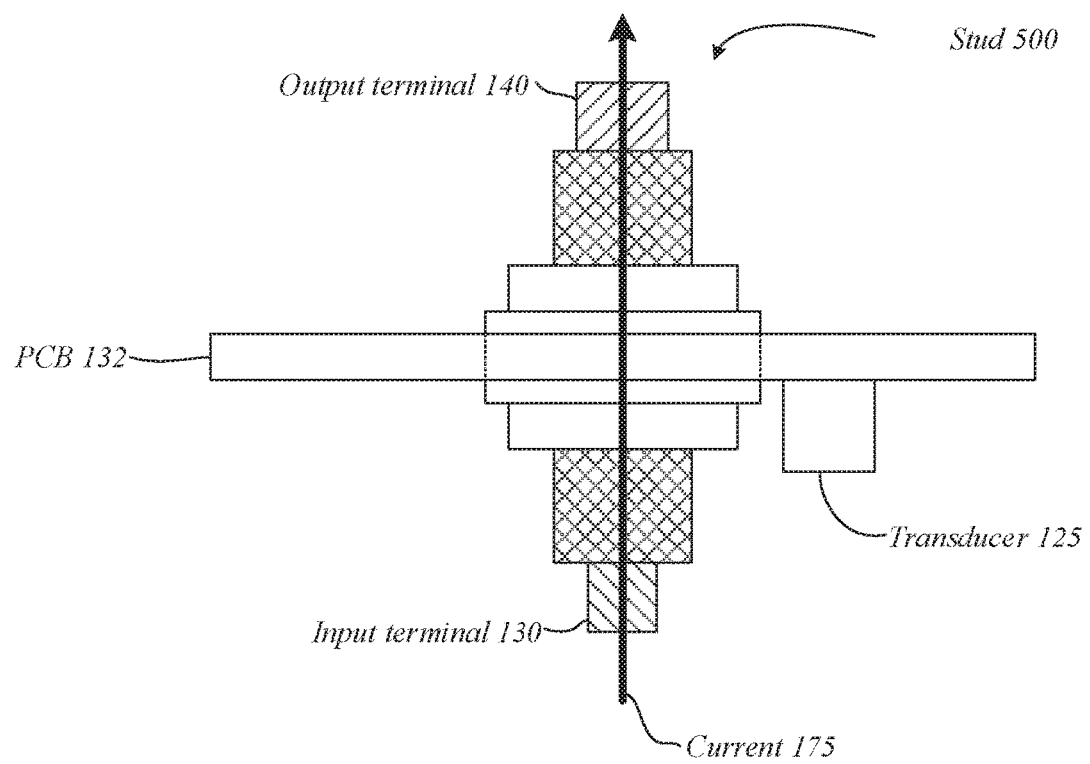
FIG. 7 is a side view of an exemplary stud in conjunction with a transducer in accordance with an embodiment of the present disclosure.

In FIG. 7, a side view of an exemplary stud 500 in conjunction with transducer 125 in accordance with the present disclosure is shown. FIG. 7 can include input terminal 130, an output terminal 140, PCB 132, and transducer 125. In the illustrated embodiment, PCB 132 can position transducer 125 proximate stud 500. In various embodiments, PCB 132 may position transducer 125 proximate a physical depression in stud 500, such as a notch or recess. In other embodiments, transducer 125 may be mounted to stud 500. In some embodiments, PCB 132 may make one or more electrical connections with stud 500. For example, electrical connections between stud 500 and PCB 132 may be utilized to power a secondary load or one or more components of battery monitoring system 100.

The stud 500 may extend through, and connect to, the PCB 132. The transducer 125 may be coupled to the PCB 132. The transducer 125 can be positioned proximate the stud 500 to detect an electric field generated by the current 175 passing between the input and output terminals 130, 140. The magnitude of the detected electrical field may then be used to determine the current 175 flowing through the stud 500. By positioning the transducer 125 proximate the stud 500, current measurements of a desired accuracy and/or efficiency may be obtained. In some embodiments, the stud 500 can include a recess or notch (not shown) configured to allow the transducer 125 to be positioned in close proximity to the stud 500. For example, transducer 125 may be positioned on PCB 132 such that transducer 125 is located at least partially within the notch or recess. The recess or notch can enable transducer 125 to be positioned directly adjacent to a portion of the stud having the highest current density.

It will be appreciated that while the illustrated embodiment of the stud assembly 700 includes transducer 125 positioned adjacent to input and output terminals 130, 140, other combinations of positions and transducers are contemplated without departing from the scope of the disclosure. For example, in some embodiments the transducer may encircle stud 500 on PCB 132. In another example, multiple transducers may be used to monitor current provided to different loads.

Figure 8A:
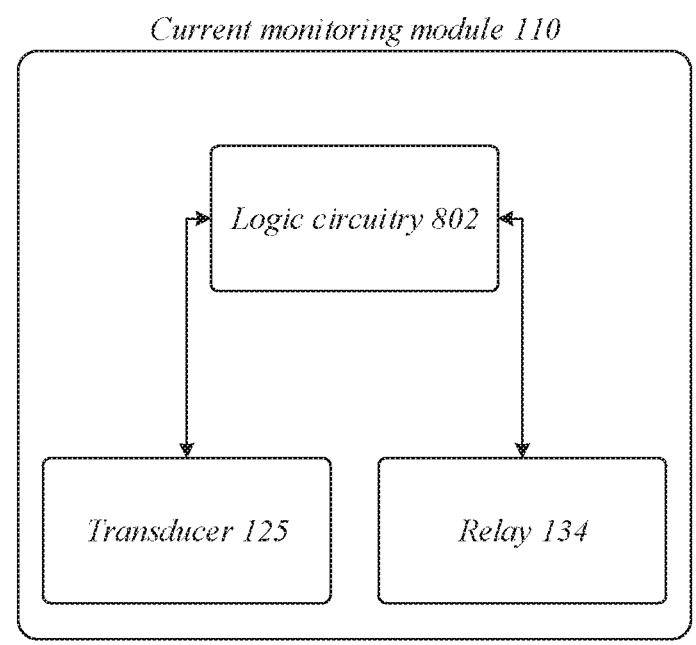
FIG. 8A is a schematic of an exemplary interface module in accordance with an embodiment of the present disclosure.

Referring now to FIG. 8A, an exemplary current monitoring module 110 in accordance with the present disclosure is shown. The current monitoring module 110 may include transducer 125, relay 134, and logic circuitry 802. In various embodiments, logic circuitry 802 may be communicatively coupled with one or more of transducer 125 and relay 134. One or more portions of logic circuitry 802 may implement one or more functional aspects described herein. In various embodiments, logic circuitry 804 may include logic and memory, such as an application specific integrated circuit (ASIC), a field programmable gate array (FPGA), a system on a chip (SOC), or similar computing devices.

In some embodiments, the current monitoring module 110 may be configured to monitor the status of the battery 170 (FIG. 1). Based on the status of the battery, logic circuitry 802 may activate relay 134. For example, if the status of the batter is below a predetermined threshold, logic circuitry 802 may prevent power from reaching secondary load 185 (FIG. 1) by causing relay 134 to open. In some embodiments, the memory may store instructions that when executed by the processor, cause data generated from transducer 125 to be stored to the memory, a remote memory (e.g., memory of interface module 150), or a removable memory. In various embodiments, the data generated from current monitoring module 110 (e.g., transducer 125 data) may be communicated to interface module 150 via control link 149 (FIG. 1).

Figure 8B:
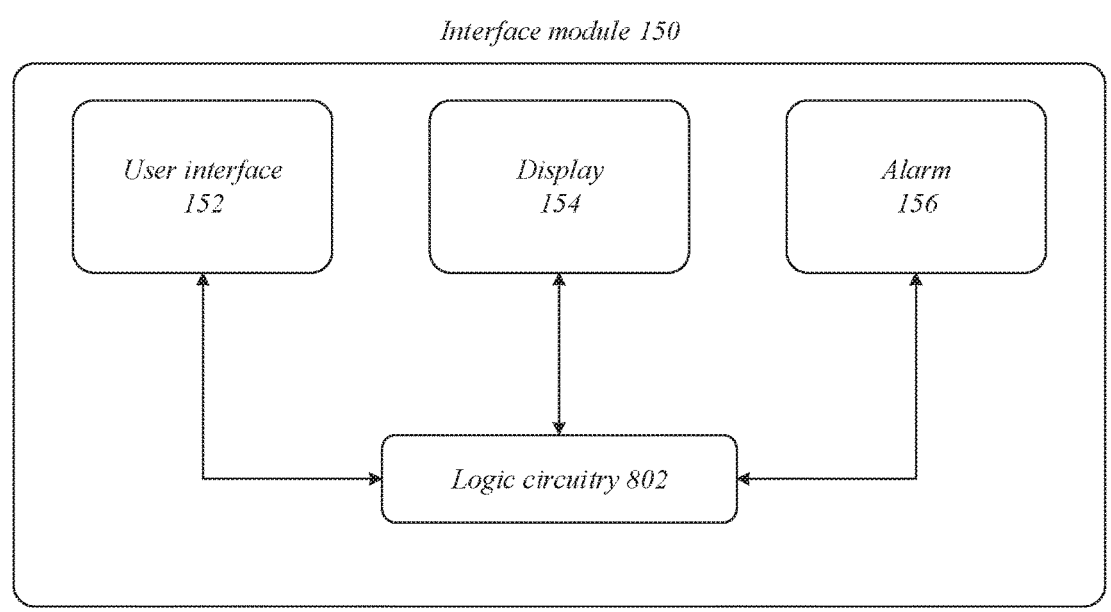
FIG. 8B is a schematic of an exemplary current monitoring module in accordance with an embodiment of the present disclosure.

Referring now to FIG. 8B, an exemplary interface module 150 in accordance with the present disclosure is shown. The interface module 150 may include user interface 152, display 154, alarm 156, and logic circuitry 804. In various embodiments, logic circuitry 804 may be communicatively coupled with one or more of user interface 152, display 154, and alarm 156. One or more portions of logic circuitry 804, may implement one or more functional aspects described herein. In various embodiments, logic circuitry 804 may include logic and memory, such as an application specific integrated circuit (ASIC), a field programmable gate array (FPGA), a system on a chip (SOC), or similar computing devices.

In some embodiments, the interface module 150 can be configured to monitor or receive indications (e.g., from current monitoring module 110) regarding the status of the battery 170 (FIG. 1). Based on the status of the battery, the interface module 150 may be configured to provide an auditory, visual, or tactile alert to a user via one or more of the display 154 and the alarm 156. The alert may include one or more of a cause of the alert and an instruction to resolve the alert. In some embodiments the interface module 150 can prevent current from reaching one or more secondary loads in response to the status of the battery.

In various embodiments, the interface module 150 may be configured to receive user input via user interface 152. Based on the received user input, the interface module 150 may control one or more operation aspects of the battery monitoring system 100. For instance, interface module 150 may cause the display 154 and/or the alarm 156 to communicate the status of the battery 170 based on user input. In some embodiments, the user may set and/or alter one or more predetermined values or thresholds to trigger an alert via the user interface 152. In one embodiment, one or more alerts can be cleared or removed via appropriate user input. In various embodiments, the interface module 150 may alter the current reaching one or more loads 180, 185 (FIG. 1) in response to user input at the user interface 152. In some embodiments, one or more parameters of transducer 125 may be altered by user input. For example, user input may calibrate or alter a duty cycle of the transducer.

FIG. 9 illustrates an embodiment of an exemplary logic flow 900 according to the disclosure. The logic flow 900 may be representative of some or all of the operations executed by one or more embodiments described herein, such as battery monitoring system 100, current monitoring module 110, or interface module 150. Embodiments are not limited in this context.

In the illustrated embodiment shown in FIG. 9, the logic flow 900 may measure a current from a battery with a Hall Effect sensor, the current powering a primary load and a secondary load at 902. At 902, a status of the battery may be calculated based on the measured current. The status of the battery may be compared to a predetermined value at 906. At 908, a relay may be activated when the status of the battery is below the predetermined value, activation of the relay may prevent the current from powering the secondary load.

As used herein, an element or step recited in the singular and proceeded with the word "a" or "an" should be understood as not excluding plural elements or steps, unless such exclusion is explicitly recited. Furthermore, references to "one embodiment" of the present invention are not intended to be interpreted as excluding the existence of additional embodiments that also incorporate the recited features.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Furthermore, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

The invention claimed is:

1. A battery monitoring system, comprising:
    a housing having an input port, an output port, and a communication port, the housing to enclose a printed circuit board (PCB);
    an input terminal to extend through the input port of the housing and electrically connect to a positive terminal of a battery;
    an output terminal to extend through the output port of the housing and electrically connect to the input terminal and a primary load;

a transducer communicatively coupled to the PCB, the transducer to sense an electric field generated by a current flowing from the positive terminal of the battery through the input terminal to the primary load and a secondary load;

a relay communicatively coupled to the PCB, the relay configured to selectively prevent current from reaching the secondary load;

a control link with first and second ends, the control link to extend through the communication port of the housing, the first end of the control link communicatively coupled to the PCB; and an interface module coupled to the second end of the control link, the interface module configured to indicate a status of the battery, wherein the status of the battery is based on the sensed electric field, the status of the battery including one or more of a current charge capacity of the battery as a percent of an original change, capacity of the battery, a temperature of the battery, and an estimated amount of time until a supply voltage of the battery drops below a predetermined value.

2. The battery monitoring system of claim 1, the interface module to cause the relay to prevent current from reaching the secondary load based on the status of the battery.

3. The battery monitoring system of claim 1, the primary load comprising a refrigeration unit.

4. The battery monitoring system of claim 1, the interface module coupled to the PCB.

5. The battery monitoring system of claim 1, comprising:
a first gasket disposed between the input port and the input terminal for forming an environmental seal between the input port and the input terminal;
a second gasket disposed between the output port and the output terminal for forming an environmental seal between the output port and the output terminal; and
a third gasket disposed between the communication port and the control link for forming an environmental seal between the communication port and the control link.

6. The battery monitoring system of claim 1, the interface module communicatively coupled to an alarm, the alarm comprising audible or visual alert in response to a determined status of the battery.

7. The battery monitoring system of claim 1, the interface module communicatively coupled to a display and the interface module configured to indicate the status of the battery on the display.

8. The battery monitoring system of claim 1, the interface module communicatively coupled to a user interface to receive user input.

9. The battery monitoring system of claim 8, the interface module configured to indicate the status of the battery on a display in response to the user input.

10. An apparatus, comprising:
a housing having an input port and an output port, the housing to enclose a printed circuit board (PCB);
a stud including an input terminal to extend through the input port of the housing and electrically connect to a battery, an output terminal to extend through the output port of the housing and electrically connect to a primary load
a transducer coupled to the PCB and positioned on the PCB such that at least a portion of the transducer is located directly adjacent the stud, the transducer to measure a current in the stud; and
an interface module coupled to the PCB and configured to indicate a status of the battery, wherein the status of the battery is based on a sensed electric field, the status of the battery including one or more of a current charge capacity of the battery as a percent of an original change, capacity of the battery, a temperature of the battery, and an estimated amount of time until a supply voltage of the battery drops below a predetermined value.

11. The apparatus of claim 10, the input terminal and the output terminals being of different sizes compared to each other.

12. The apparatus of claim 11, the input terminal having threads comprising a first thread size and the output port comprising threads having a second thread size, wherein the first and second thread sizes are different from each other.

13. The apparatus of claim 11, the stud comprising at least two different thread sizes, the input terminal and the output terminal comprising a first thread size of the at least two different thread sizes.

14. The apparatus of claim 10, the stud formed from a single piece of conductive material.

15. A method, comprising:
measuring a current from a battery with a Hall Effect sensor, the current powering a primary load and a secondary load;
determining a status of the battery based on the measured current;
comparing the status of the battery to a predetermined value;
activating a relay when the status of the battery is below the predetermined value, activation of the relay to prevent the current from powering the secondary load; and
indicating the status of the battery via an interface module, the status of the battery including one or more of a current charge capacity of the battery as a percent of an original change, capacity of the battery, a temperature of the battery, and an estimated amount of time until a supply voltage of the battery drops below a predetermined value.

16. The method of claim 15, comprising receiving the predetermined value via an interface module comprising a user interface.

17. The method of claim 15, comprising adjusting the predetermined value based on input received via the interface module.

18. The method of claim 15, comprising activating an alarm when the status of the battery is below the predetermined value.

* * * * *